Inventors:
Arnold J. Eisenberg,
Henry T. Pauk,
Leo Lutz,
by Emery, Booth, Miller & Townsend
Attys

REGISTERED LENGTH TAPE DISPENSING WITH REGISTER COMPENSATING MEANS

Filed Jan. 9, 1962 5 Sheets-Sheet 2

Inventors:
Arnold J. Eisenberg,
Henry T. Pauk,
Leo O. Lutz,
by Emery, Booth, Miller & Townsend
Attys April 27, 1965 H. T. PAUK ETAL 3,180,192

REGISTERED LENGTH TAPE DISPENSING WITH REGISTER COMPENSATING MEANS

Filed Jan. 9, 1962 5 Sheets-Sheet 3

Inventors:
Arnold J. Eisenberg,
Henry T. Pauk,
Leo Lutz,
by Emery, Booth, Miller & Townsend
Attys Inventors:
Arnold J. Eisenberg,
Henry T. Pauk,
Leo O. Lutz,
by Emery, Booth, Miller & Townsend
Att'ys Inventors:
Arnold J. Eisenberg,
Henry T. Pauk,
Leo Lutz,
by Emery, Booth, Miller & Townsend
Attys 3,180,192

REGISTERED LENGTH TAPE DISPENSING WITH REGISTER COMPENSATING MEANS

Henry T. Pauk, Nashua, and Leo O. Lutz, Hollis, N.H., and Arnold J. Eisenberg, Brookline, Mass., assignors to Nashua Corporation, Nashua, N.H., a corporation of Delaware Filed Jan. 9, 1962, Ser. No. 165,152
4 Claims. (Cl. 83—247)

Our present invention concerns the dispensing of adhesively applicable flexible paper and other strips from supplies such as rolls for use in labelling, packaging and other purposes. In more particular the invention has as a primary object to provide improved methods, apparatus and devices suited to the dispensing of such strip material optionally in single and in plural unit lengths.

A typical use is for strips carrying repeat-design labels. These desirably are to be severed between adjacent label units without mutilation of the printing or other repeat design thereon, so that each delivered strip contains only complete label units, whether one or more of them, without appended fractional units.

One example of apparatus and methods with which our invention are concerned is disclosed in the copending application of Arnold J. Eisenberg, Serial No. 9,972, filed February 19, 1960, now Patent No. 3,147,139. The present invention in certain aspects represents improvement upon that of said application, especially with reference to positive registry for the strip material to be dispensed.

In the drawings illustrating by way of example one embodiment of the invention:

FIG. 7 is a diagrammatic illustration of a length of a typical tape to be dispensed and showing several repeat design units thereof;

FIGS. 9 to 11 show a roll carrier and guide element separately, wherein

FIG. 9 is a top plan view,

FIG. 10 is a right side elevation and

FIG. 11 is a longitudinal section as on the line 11—11 of FIG. 9.

Figure 1:
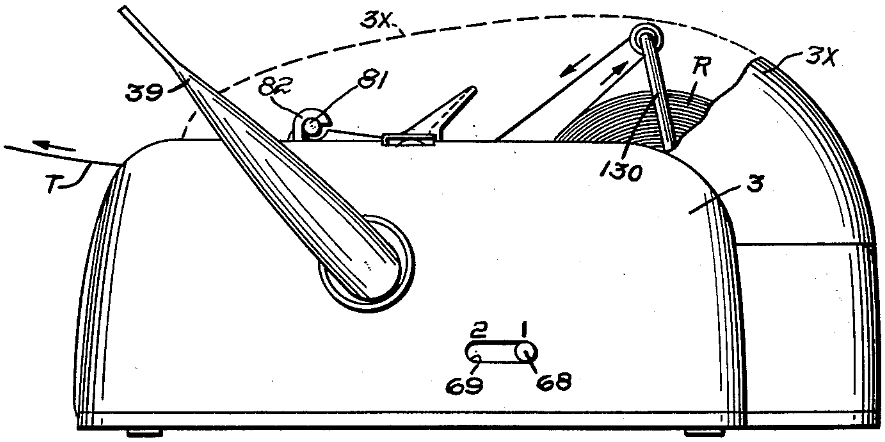
FIG. 1 is a right side elevation of a tape dispensing machine, with a top cover partly broken away.

The exemplary machine of the drawings is similar in general organization as in said copending application mentioned. Parts herein not otherwise described may be understood as generally similar as in said application, the disclosure in which is in effect incorporated herewith by reference.

Considering the drawings in more detail, the illustrated machine comprises an elongate left side frame member 1 and spaced toward the right of the machine a longitudinal right side frame 2 providing between them a main compartment for the tape feeding, severing and moistening mechanism and a longitudinal path for the tape T. Said right side frame 2 carries at the outer face a side cover plate 3, removed in FIG. 5, such cover plate and the adjacent frame 2 defining between them space for certain of the feed control parts. Said longitudinal frames 1 and 2 are separably secured together by transversely aligned bosses and abutments and associated screw bolts, one of which is seen at 2' at the lower left in FIG. 5.

The space between the frames 1 and 2 at the rear of the machine, at the right in FIGS. 1 to 4, provides a well for the reception of a roll supply R of the tape T to be dispensed. There the roll R is rotatably mounted by novel means to be described so as to be supported above and out of contact with the well floor plate 5 on the housing and whereby the tape roll R is rotatable with a minimum of frictional drag on the tape. The tape T is advanced to and between rotary feed members comprising opposed lower and upper feed rolls 10 and 70, to and past severing means at a cut-off station as defined by the fixed and movable blades 6 and 7, FIGS. 5 and 6. Thence the tape path continues forwardly over a brush or other capillary moistening means 55 upstanding from a liquid reservoir 56 set in the housing. The adhesively conditioned tape lengths are projected at a delivery station at the front of the machine, as provided by the generally horizontal table-like top portion 8 of the front closure of the housing. Between said severing and said moistening means the tape T is directed through a throat comprising an under guide plate 57 and an overlying deflector plate 58 pivotally supported at its front end coaxially with a depressor roll 59 vertically opposite the projecting end of the brush 55.

To assist in the positive registration of the tape with respect to the unit lengths thereof, such as represented in FIG. 7, the supply roll R as mentioned is mounted for relatively free rotation. Also in cooperation with such roll mounting and as further assisting in said positive registration and the other provisions therefor to be described means desirably are included for minimizing back-lash on the tape from the roll in or following a dispensing cycle.

For said purposes of aiding the tape registration the supply well is furnished with a pair of stationary lateral guides or plates 120, 120 adapted to receive between them a tape roll R of the desired width. These plates 120 serve herein both as guides and also provide rotary bearing support for the tape roll R. They extend over a major length of the well, being fixedly positioned at the rear as by ears fitted into slots in the well floor plate 5 in appropriately spaced relation, just forward of the point where the right-hand said plate is shown broken away on FIG. 6. At the front ends the plates 120 have further dependent flanges likewise fixedly fitted into corresponding apertures in the floor plate closely behind the feed means 10, 70. At an intermediate point along the plates, selected for locating the tape roll R in a generally central position with respect to the well the upper portions of the plates have transversely aligned bearing formations 123 shown as vertical recesses flared at the top and rounded at the bottom as at 124 to afford rotary bearing support for a special roll adapter and rotary bearer element designated generally at 125.

Figure 6:
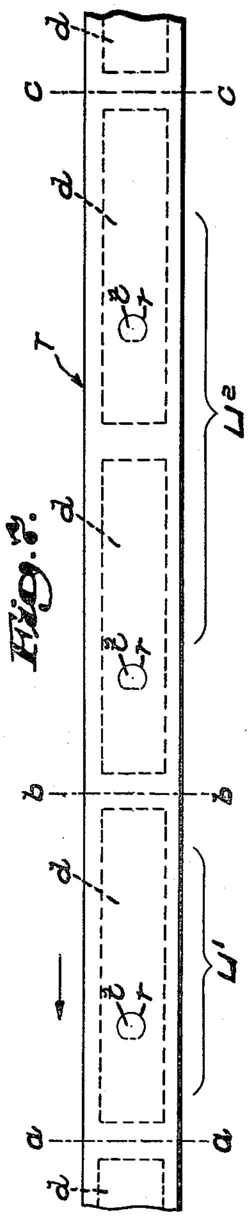
FIG. 6 is a substantially central longitudinal vertical section of the machine with front and rear end portions broken away.
Figure 6:
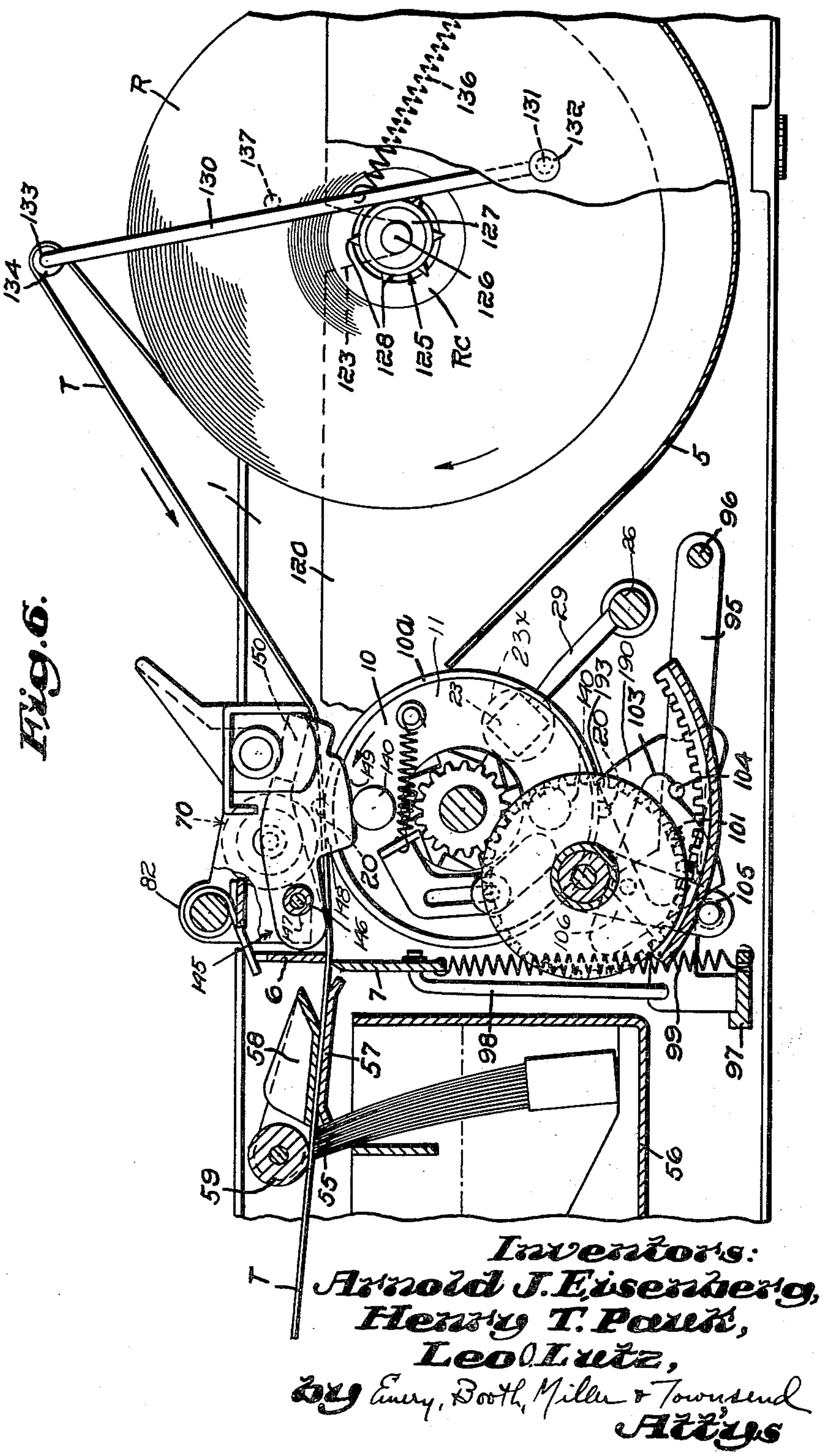

As best seen in FIG. 6 said roll bearer element 125 of the machine comprises a central shaft or pintle projecting at the opposite sides as bearing hubs 126 respectively adapted for rotary support in said rounded bottoms 124 of said bearing formations 123. Between said aligned hubs 126 of the roll adapter 125 is a concentric barrel portion 127 having at the periphery a series of pointed ribs 128 paralleling the bearing axis and of an outer diameter for tight fitting interengagement with the surrounding inner wall of the wood or other yieldable or penetrable core $R_c$ of the tape roll R. In installing a tape supply in the machine the bearing adapter 125 is forced into the central aperture of such roll core $R_c$, with the sharp-edged ribs 128 in meshing engagement with it so as in effect to couple the tape roll and the rotary bearer 125 for turning as a unit. A tape supply roll R with the bearing adapter 125 so installed need merely be set down into the guide plate bearing formations 123 where the hubs 126 are automatically rotatably received in the rounded bottoms 124 thereof.

The mentioned cooperative means for avoidance of back-lash on the tape is herein accomplished through provision of a dancer device by which the tape instead of passing directly from the roll to the rotary feed means is accorded a relatively free loop. Such tension-controlling loop-forming means comprises a rod or arm 130 having at the bottom end a laterally projecting foot 131 rotatably inserted in an apertured boss 132 on the adjacent machine side frame. At the upper end the arm 130 is an oppositely turned leg 133 adapted to overlie the top of the roll and having a free turning roller 134 received on it. As best seen in FIG. 6 the tape T from the roll is led upwardly and rearwardly behind the dancer roll 134, turns forwardly over it and thence down to the region of the feed rolls 10, 70.

The tension-controlling loop-forming arm or dancer element 130 is resiliently urged to a normal generally upright position substantially as in FIG. 6 as by means of a light coil spring 136 hooked at the front end to the arm 130 and at the other end anchored to a fixed part on the housing. A stop 137 such as a pin extending from a side frame of the housing limits rearward swinging movement of the arm 130. Thus under feeding advance of the tape the arm 130 with its loop-forming roller 134 is enabled to swing down and forwardly in reduction of drag from the body of the roll R, and to swing back upon tape severance to reform a loop substantially as in FIG. 6 and to take up slack in the tape for preventing backlash thereof.

The lower feed roll 10, similarly as in the mentioned copending application, is shown as a hollow drum having a circumferential flange 10*a*, FIG. 6, with a knurled tape-engaging face and said flange being formed on a radial wall 11 of the drum, the latter having a central hub 12 axially apertured for rotary bearing on a stationary transverse stud shaft 15. As seen on FIG. 3 one end of the shaft is received in a boss 1*x* on the left side frame 1, the other shaft extending outwardly through the opposite frame 2. At one face of said lower feed roll 10 a pawl 13, FIG. 6, is pivoted on a pin 13*a* and is yieldingly held in driving relation with a separate ratchet disc 16 turnable on the stud shaft 15. A concentric pinion 17 fixed with the ratchet disc 16 meshes with a gear 18 rotatable on a bearing boss 19 carried by a main operating element or crank 30 for angular movement about the axis of the main shaft 15. Said crank 30 has a bearing sleeve 31, FIG. 3, received on the projecting end of said shaft 15. The gear 18 on and bodily moving with the crank 30 meshes with and is reactively rotated from a stationary arcuate rack 32 fixed on the adjacent side frame 2, the latter having an elongate arcuate opening through which the gear bearing boss 19 projects with freedom for bodily swinging movement about the axis of the stud shaft 15 through a maximum arc of available length to afford through the described gear connections the desired maximum feed length for the tape, such as two unit lengths in the illustrated example.

Figure 5:
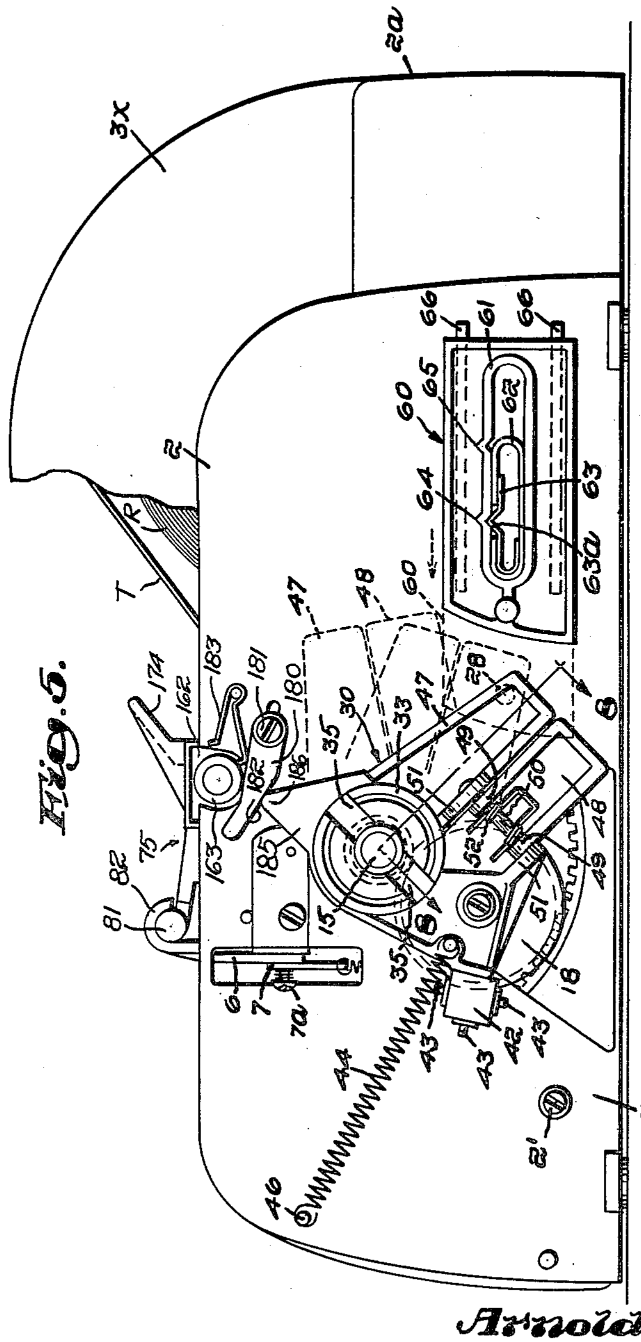
FIG. 5 is a right side elevational view with the outer side cover plate removed.

Said operating crank 30 has a bearing hub 33 received on the sleeve 31 on the stud shaft 15. At the outer face said crank hub 33 is radially slotted as at 35, FIG. 5, to accept radial connector lugs 36, FIG. 3, at the inner end of a centrally bored hub 37 of the operating hand lever 39. The side cover plate 3 has in line with the stud shaft 15 an aperture dimensioned to receive said hand lever hub 37 and having opposed radial recesses for passage of said connector lugs 36 of said hand lever hub. These recesses are angularly offset with respect to the radial slots 35 of the crank hub in the normal or rest position of the hand lever. Thus the described radial slot and lug means provides both for releasable connection of the hand lever 39 in fixed angular relation to the operating crank 30 and also for normal retention of the hand lever in installed position upon the sleeve 31 on the stud shaft 15. Said hand lever 39 may readily be demounted by removing the anchor screws of the side cover plate 3 and turning the latter slightly about the axis of the stud shaft 15 sufficiently to align the radial slots of the cover plate 3 with the inwardly projecting lugs 36 of the hand lever. Thereupon the cover plate 3 and the hand lever 39 may both be withdrawn, in generally similar fashion as in said application Serial No. 9,972. In FIG. 5 said parts are removed, exposing the right frame 2 of the machine.

With the machine parts assembled in operative position it is apparent that depression of the hand lever 39 from its normal elevated approximately 10 o'clock rest position of FIG. 1 will turn the operating crank 30 counterclockwise about the axis of the shaft 15, thereby bodily swinging the eccentrically mounted gear 18 rearward, to the right on FIGS. 5 and 6. By reason of its toothed engagement and reactance with the stationary arcuate rack 32 the gear 18 is simultaneously caused to rotate upon its own axis, in a clockwise direction viewing said figures. Said gear 18 also being in mesh with the pinion 17 concentric with the stud shaft 15 acts to turn said pinion 17 counterclockwise and with it the ratchet wheel 16 thereby through the pawl 13 to drive the lower feed roll 10 in the tape feeding direction, counterclockwise as indicated by the arrow on FIG. 6. The feed drive mechanism as described to this point may be understood as generally similar to that of said Eisenberg application Serial No. 9,972 earlier mentioned herein.

In operative correlation with the described feed means, and with the length selector means as well as the associated improved tape registering features to be described the machine in the here disclosed embodiment includes severing or cutter means whereby in the course of the return stroke of the hand lever 39 the selected single or dual unit length of tape T for delivery past the adhesively conditioning moistener element 55 is cut off at the accurately presented line between tape length units such as indicated at *a—a*, *b—b* or *c—c* on FIG. 7.

This is accomplished by operating connections for the movable blade 7 controlled by said lever and by the feed-operating gearing associated with the crank 30. Such connections include a trip lever 95, FIGS. 3 and 6, longitudinally extending near the base of the machine between the frames 1 and 2 and pivoted at the rear end as at 96 on the adjacent frame 2. The front end of this knife trip lever 95 normally rests on a down-stop 97 on the frame 2. It is connected to the mentioned movable blade 7, mounted for vertical swinging about a pivot 7*a*, by a link 98 pivoted at the lower and upper ends respectively to the trip lever 95 and to said blade 7. A coil spring 99 connected between the blade 7 and a fixed part on the frame 2, conveniently the down stop 97, normally holds the blade 7 inactively below the path of the tape.

This trip lever 95 is lifted to actuate the blade 7 through the return motion of the hand lever 39 and the crank 30, by means of a dog 100 pivoted as at 101 on the trip lever 95 and spring biased to be held with a rear toe 103 thereof against a stop 104 below it on the knife trip lever 95. In a position normally forward of the front face of the dog 100 is a cam roll 105 at the depending lower end of a finger 106, FIG. 6, angularly fixed at its upper end on the collar 19 of the feed drive gear 18 so as to move in fixed angular relation with the crank 30.

In the tape feeding portion of an operating cycle, under depression of the hand lever 39, the cam-roll-carrying lower end of said finger 106 moves rearwardly with the crank 30, toward the right on FIG. 6 and yieldably lifts and passes beyond the dog 100 which then drops with the aid of its spring into position behind said cam roll 105. On release of the hand lever 39 following a feed stroke the opposite return motion of the crank 30 and the cam roll 105 causes the latter to abut the dog 100 forwardly of its pivot 101. Since the dog is then prevented from reverse turning by reason of the abutment of its toe 103 against the stop 104 the trip lever 95 is bodily lifted in a rapid up stroke and with it the movable blade 7 thereby to sever the tape. On completion of each operating cycle the dog 100, trip lever 95 and blade 7 resume their normal rest position as in FIG. 6 ready for performance of the next cycle.

As explained with reference to FIG. 7 the invention is especially concerned with dispensing adhesively conditioned tape in predetermined accurate lengths corresponding with areas for display of legends, designs and the like, pre-printed or otherwise applied, a number of which areas, herein termed design areas or simply designs, are indicated at *d*, *d*, etc., FIG. 7. Tape portions comprising such areas, such as between the exemplary cut-off or division lines *a—a* and *b—b* of FIG. 7 are herein referred to as design or unit lengths. They may be single or plural as to the number of design areas chosen to be dispensed in one serving operation. On said figure a single unit length is indicated at U1 and a plural unit length, comprising two repeat design areas in this instance, is designated at U2.

Similarly in general as in said application Serial No. 9,972 registry of the tape with respect to the cut-off line at the severing station is accomplished by means carried by and forming a part of the tape itself and operatively coacting with the other mechanical means of the machine in the controlling of tape registry through radial projections on the driven feed roll 10 and adapted to make tape registering engagement with such means on the tape. Two of such projections are illustrated in the present machine, FIGS. 3 and 6, at the knurled or transversely corrugated peripheral surface of the lower feed roll 10 and in this instance spaced 180° thereon.

Again noting FIG. 7, such registry means on the tape comprises the aperture formations or parti-circular holes *r* defined by through cut or punch lines each of at least half-circular extent and preferably sufficiently exceeding 180° of arc as to define an approximately three-quarter-round tab *t* hinged at the tape body along a transverse line joining the adjacent ends of these circular cut formations *r*. The tape T is supplied in the roll and the latter so presented in the machine by the described rotary bearing means that the hinges of the register-hole closing tabs *t* lead and the circular cut portions trail, in the manner of reverse letters "C." Up to the feed and registry station these tabs *t* of the register holes *r* remain substantially in coincidence with the web of the tape. On approaching the bite line of the feed rolls they are lifted by the entry of the registry pins into registry holes *r*. Thereafter as each selected tape length is dispensed the tabs *t* are more or less completely restored to coincident hole-closing position in the tape, in the passage thereof across the moistener 55 and below the overlying deflector plate 58 and depressor or roll 59. In the surface-applied use position of the dispensed adhesively conditioned tape lengths the tabs *t*, which themselves are adhesive at the underface are held in coincidence with said tapes or labels and are scarcely distinguishable on them, thus causing minimal interference with or interruption of the legend or design matter thereof.

It will be understood that the feed roll 10 and the unit lengths such as U1 of the tape are relatively proportioned and dimensioned lineally so that one or more of the tape unit lengths are commensurate with the circumference of the feed roll. In the illustrated example having two registry pins 20, 20, a single unit length U1 equals a half circumference of the feed roll 10 and a double unit length such as U2 corresponds to a full circumference or one complete revolution of said feed roll. Further, the feeding and severing means of the machine are so operated and controlled, with length selection capacity, that for each full feed stroke of hand lever 39 and release and return thereof to complete an operating cycle. The tape is automatically positioned with the next available inter-design division line at a definite location on the machine spaced rearwardly of the severing station defined by the cut-off knives 6, 7 to an extent equal to one design unit length. Said location on the machine is defined by the bite line of the feed rolls 10, 70 and at which a register pin 20 is caused to halt the end of each full-stroke cycle. Cooperatively the register holes *r* of the tape, see FIG. 6, are located on the tape in like measured extent each behind the preceding desired cut-off or unit division line.

According the rotary feed mechanism is provided with feed halting means, having length-selecting capacity, herein as between single unit lengths such as U1 and double unit lengths such as U2, FIG. 7. Such means comprises a pair of stops 22, 22 on a side face of the feed roll 10, that toward the left side of the machine and away from the viewer looking at FIGS. 5 and 6. These stops 22, 22 are spaced 180° apart, similarly as the register pins 20, 20. They are engageable selectively by a roll-blocking detent 23 movably mounted on the left side frame 1 for projection into and retraction from the path of said stops. The angular location of the stops 22 and of the detent 23 relative to the register pins 20 is such that when feed roll halting abutment of either of said stops 22 with said detent 23 causes the tape feeding action to be halted, a register pin 20 is presented at the top of the roll 10 and accurately at the roll bite line as previously mentioned; see particularly FIG. 6.

Figure 8:
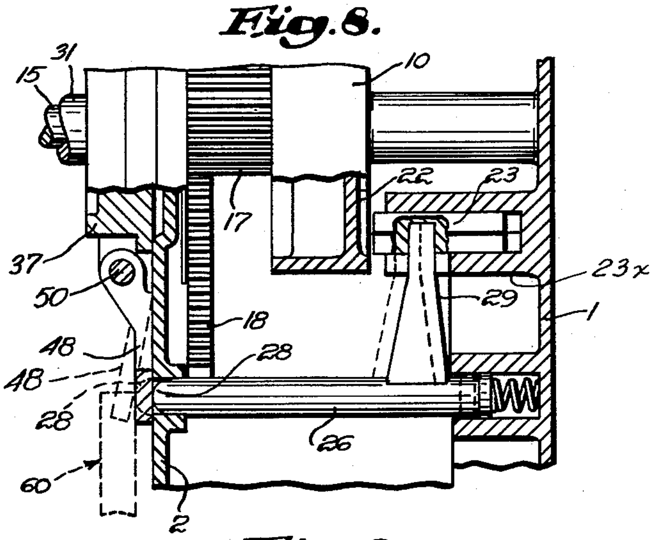
FIG. 8 is a cross-section showing certain length control means.

Said feed length determining detent 23, slidably disposed in an inwardly projecting boss 23 on the left side frame 1, is urged inwardly, toward the viewer on FIGS. 5 and 6, by a spring-pressed plunger 26 having a rounded end nose 28 to which it is operatively connected by an arm 29, see also FIG. 8. Said plunger 26 extends across the interior compartment of the machine and through an aperture in the right side frame 2 where its rounded end or nose 28 is yieldably projectible by the plunger spring. When so projected, toward the left on FIG. 3, the detent 23 moving with it is shifted into the path of said stops 22 on the feed roll 10.

Positioning and timing of said feed-halting detent 23 is determined by means operatively connected with the hand lever 39 and moving with the described operating crank 30, subject to the operator's setting of a selector 60 to be referred to. Normally, between operating cycles, upon release and return of the hand lever 39 to the elevated rest position of FIG. 1, the detent 23 is retracted, out of the stop path. Following the start of a cycle said detent is released and projected into active position for engagement by one or the other of stops 22 so as to halt the feed either at the end of a one-half rotation or 180° turn of the feed roll 10 for dispensing a single tape unit length U1, or else only after a full 360° rotation of the feed roll for dispensing of a double unit length U2. In either case on stopping of the feed one of the register pins 20 is brought into tape registering position at the roll bite line as seen in FIG. 6.

Said detent positioning and timing means, as best seen on FIG. 5, is carried on the operating crank 30 for movement with the hand lever 39 and comprises two rearwardly extending parts or fingers 47 and 48 having outer portions movable over an arc laterally opposite the cam nose end 28 of the detent-shifting plunger 26. Both parts 47 and 48 move rotatively with the operating crank 30 in fixed angular relation to it. The upper part 47 also is fixed laterally relative to the crank 30 and remains always in the same vertical plane. At the inner vertical face it has a surface for detent-retracting camming engagement and inward holding of the plunger nose 28. It is shown so engaged in the position of the parts as in FIG. 5, representing the normal position as upon completion of an operating cycle including tape severance and full return of the hand lever 39 to the normal raised position of FIG. 1, ready for the start of another cycle.

The adjacent companion and lower part 48 is laterally movable, being a flap-like member or cam plate pivoted as at 50 on the crank 30 and yieldingly held by a spring 52, relatively lighter than that of the plunger 26. Said laterally yieldable part 48 stands normally in the same vertical plane with the upper part 47.

Upon depression of the manual lever 39 as in starting a tape dispensing operation the crank 30 and the parts 47, 48 with it turn about the axis of main shaft 15 counterclockwise on FIG. 5. As said parts 47, 48 are thus shifted upwardly on FIG. 5, the laterally non-movable upper part 47 passes off from opposite the plunger 26 and the lower part 48 comes opposite it. Said flap-like part 48 being laterally yieldable and under less spring loading than the plunger 26 permits the latter to be projected outwardly by its own spring. Thereby the roll-halting detent 23 is projected into position for stopping engagement with a stop 22 of the feed roll 10. Upon completing of the particular operating cycle including tape cut-off and return of the hand lever 39 to normal position as in FIG. 1 the parts are restored to the position as in FIG. 5, with the plunger 26 retracted or thrust inwardly by the laterally non-movable upper part 47 on the crank 30 and the detent 23 correspondingly withdrawn from the path of either and both stops 22, in readiness for the next operating cycle.

To enable the operator to choose as between single and plural unit lengths of tape while still preserving registration of the imprint or label areas in the longitudinally central or other desired longitudinal location upon the unit lengths dispensed, a selector device is provided conveniently accessible to the operator. As illustrated, noting FIG. 5, this comprises a horizontally shiftable member or slide designated as a whole at 60 and having a manipulating finger piece or knob 68 projecting laterally outward through a slot 69 therefor in the side cover plate 3; see also FIGS. 1 and 2. This slide is supported and guided on ways 66 on the right side frame 2 and is held in either the full line or the dotted line positions of FIG. 5 as by a leaf spring 63 held on a fixed part and having a nib 63*a* adapted to enter one or the other of the notches 64, 65 on the slide.

In the full line position of FIG. 5 wherein the slide or selector 60 stands toward the rear of the machine, noting also the rearward position of the finger piece 68 on FIG. 1, the machine is selectively set for operating in the manner above described for dispensing of single unit lengths such as U1 of FIG. 7. When the operator desires to obtain a plural-unit tape length, such as a two-unit length U2 in the illustrated example, he need merely push the knob or button 68 and with it the selector 60 toward the front of the machine, toward the left on FIG. 5, to the position designated "2" on FIG. 1, away from the single unit selecting position "1," some such length distinguishing markings desirably being provided on the cover plate 3.

With said selector 60 shifted to the plural-unit dispensing position shown dotted on FIGS. 5 and 8 it overlies the path of movement of the parts 47, 48, noting the intermediate dotted position thereof on said FIG. 5. Thereby the release of the detent-controlling plunger 26, 28 is delayed. The detent 23 consequently is held out of the path of the stops 22 until the laterally yieldable part 48 has traveled with the crank 30 to a position above and clear of the plunger 26, 28. During such delay interval the first approaching stop 22 passes the detent position. In the present example the parts are proportioned, constructed and arranged so that something more than a half turn of the lower feed roll 10 is accomplished during the described delay interval. Thereafter the pivotally yieldable part 48 upon moving clear of the plunger 26, 28 permits the plunger 26 to be projected for inserting the detent 23 for feed-stopping engagement by the next approaching stop 22.

The machine selected by way of example for the purposes of disclosure of the present invention is, as earlier noted, generally similar to that of copending application Serial No. 9,972 wherein a similar register apertured tape, feed means and length selecting means as herein described to this point are fully disclosed and claimed. As distinguished therefrom, certain aspects and features of improvement characterizing the present invention and as cooperatively correlated with such machine have above been described, including the novel tape supply mounting and the tape tension control and free feeding and anti-back-lash provisions for improving the design-registered delivery of the selected severed and adhesively conditioned tape lengths. Other distinctive features further novelly coacting in and with the machine mechanism as a whole will now be described.

In said application provision is made to compensate for registration error, as between a tape register hole *r* and that register pin 20 of the feed roll 10 presumed to be at the feed-starting position, i.e. topmost and vertically upward in the illustrated embodiment. Such provision as exemplified in said application functions satisfactorily so long as a full feed stroke is given to the hand lever 39 in each operating cycle, whether single or plural unit tape lengths are called for. In use however it has been found that, inadvertently or otherwise, full operational strokes of the hand lever are not always performed. For whatever reason, sometimes an approximate half-stroke or other parital operating stroke may occur. Then on release and return of the hand lever 39 the register pin 20 which under a full feed stroke would be turned with the fed roll 10 into the vertical or correct feed-starting position is left in a more or less horizontal or other angularly displaced position about the feed roll axis.

Under such occurrence the purpose of the registry compensating feature of said application may be in whole or part defeated, there then being no vertically presented pin 20 for accomplishment of tape hole *r* alignment. Further, such earlier compensating provision, organized on the assumption of correct "vertical" location of a register pin 20 on each return stroke of the feed lever 39 (as is the case when full "forward" or feed strokes are performed) can under the occurrence of a partial feed stroke not only fail to remove but even tend to increase misalignment error. This is because the interrupting of the pinching or tape-feeding relation of the lower and upper feed rolls 10, 70, as by lifting of the upper or pinch roll 70, at a time when no register pin 20 is present in vertical position to make at least approximate alignment with a tape register hole *r* frees the tape, at least briefly, to move under reverse tension or otherwise with tendency in such absence of an aligned registry controlling pin 20 to introduce alignment error or to add to whatever minor and normally correctible misalignment may have been present under full feed stroke operation and attendant normal correct presentation of a register pin 20 at the upright or vertical position.

Accordingly as an important feature of the present invention means is provided whereby release of the tape from feeding engagement by the rolls, as by relative separating movement of the rolls, herein by relieving the pressure of or lifting the upper or pinch roll 70, takes place at the return of the feed lever 39 only if and when the feed roll 10 is so positioned that a register pin 20 is in tape registering position at the roll bite location, namely, one such pin 20 being upright or top vertical in the illustrated embodiment.

Such means as herein exemplified comprises roll separating provision operatively associated with the feed lever return motion and having an active status and an inactive status in which respectively the parts are positioned or conditioned for feed-roll-separating tape register compensation when a register pin 20 is correctly located, in the upright vertical relation as characterized by a full stroke feed operation, and for avoidance of such roll separation if and when a register pin 20 is absent from correct tape-controlling location upon lever return, as when a less-than-full feed stroke of the hand lever has been made. This applies whether the length selector is set for single unit or plural unit deliveries of the tape. Because of such non-separation of the rolls on lever return from a partial stroke the tape remains held by the rolls, in correct register as established, with register compensation, at the last prior return of the lever from a full stroke. On next performance of a full feed stroke, or of one or more additional partial strokes sufficient to extend the first partial stroke to a full stroke, normal operation automatically resumes and delivery of accurately registered unit lengths continues, with automatic register compensation on lever return from each full stroke. Depending on whether the partial stroke or strokes was or were adequate to effect tape cut off, one under-length unit followed by a correcting over-length unit may be served. In the event of a part stroke without knife operation the next full-stroke completing operation continues the service of only correct unit lengths, single or plural according to the selector setting. Infrequently, under a single length setting a chance or deliberate sequence of part strokes, such that action of a locating feed stop 22 is in effect "passed," may result in one service of a double or other plural length unit. Such is followed by resumption of only single unit lengths under normal full-stroke operation and continued single unit setting of the selector, or by service of plural unit lengths if the selector setting is shifted thereto.

Figure 3:
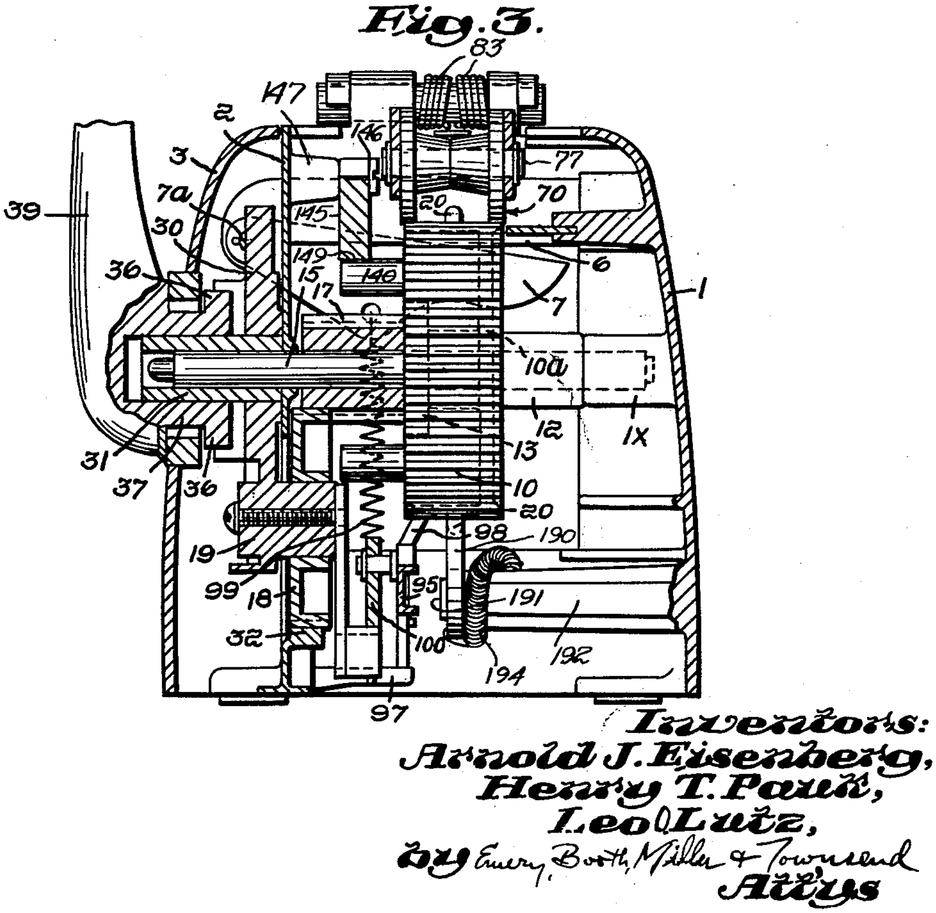
FIG. 3 is a cross-section as on the line 3—3 of FIG. 2, on a still larger scale.
Figures 2, 4:
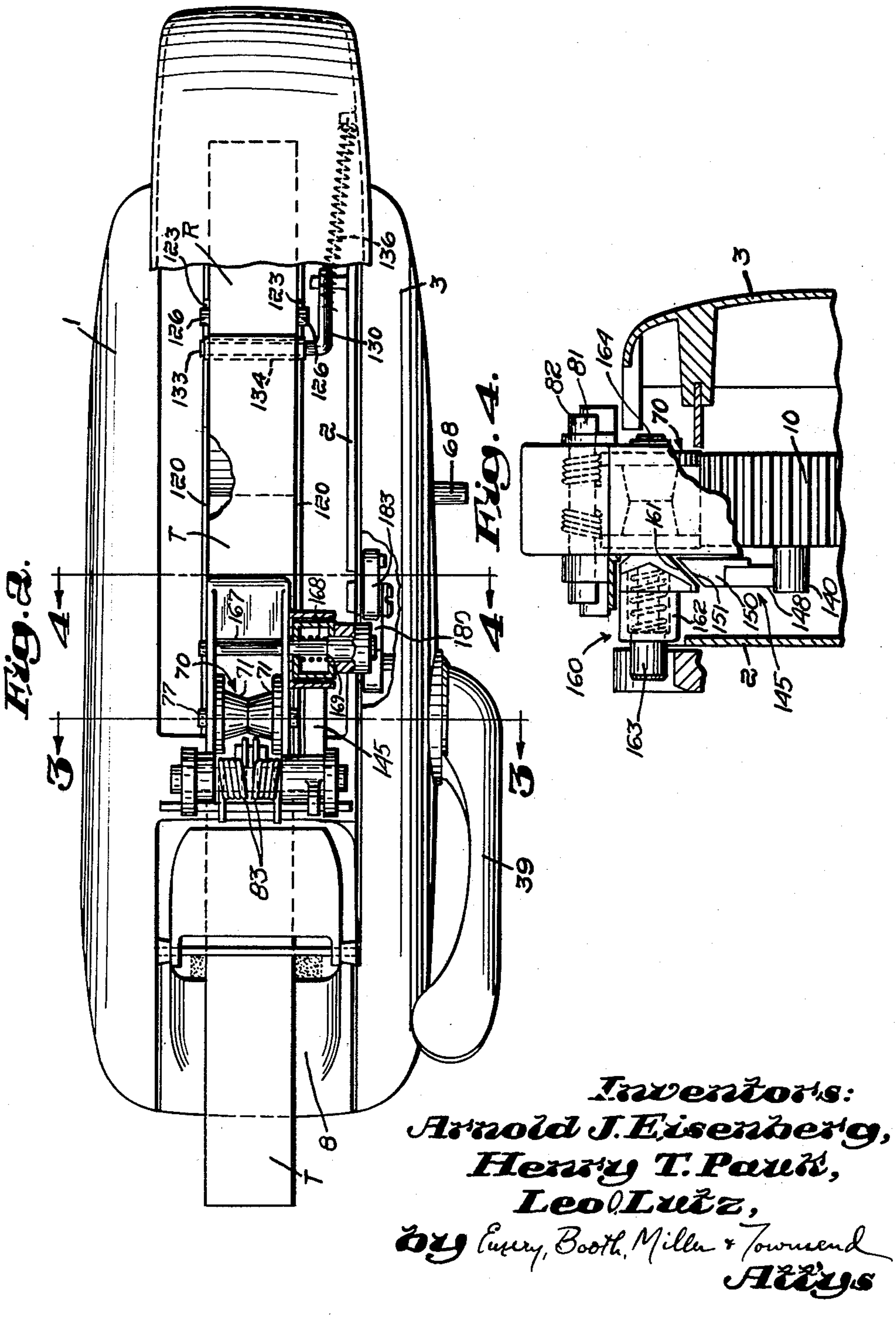
FIG. 2 is a top plan of the machine of FIG. 1 upon a somewhat larger scale.
FIG. 4 is a partial cross-section as on the line 4—4 of FIG. 2 and on the scale of FIG. 3.

Such roll-separating register compensating means automatically correlated with the angular position of the driven feed roll 10 so as to be active or inactive according to the presence or absence of a register pin 20 in the desired herein upright location comprises for each register pin 20 a compensator control or conditioning lug 140, 140, FIGS. 3, 4 and 6. These are carried by the hollow drum-like driven feed roll 10 as on the radial wall 11 thereof at like distances from and paralleling the axis thereof. These lugs 140, 140 are disposed in determined angular relation to and in like angular spacing as the register pins 20, 20. In the present instance of two such pins spaced 180° around the roll 10 the lugs are similarly spaced and herein are in radial line each with a corresponding pin 20. They are adapted as by projective extension laterally of the roll 10, see particularly FIGS. 3 and 4, toward the right or hand lever side of the machine, each in turn to have lifting engagement with an overlying vertically movable slide-positioning cam element 145. Said positioner element or cam 145, for positioning a slide 160 to be referred to, determines by its lug-raised position or its dropped or down position in the absence of a lug 140 liftingly below it whether or not a register compensating separation of the feed rolls is to occur on return stroke of hand lever 39 and operatively associated parts. As shown said positioner cam 145 has the form of an arm extending longitudinally of the machine and having a horizontal pivotal mounting adjacent its forward end as by a screw-headed stud 146 tapped into an approximately located boss 147 on the adjacent side frame 2. Rearwardly of said pivot 146 this positioner element 145 has a depending portion 148 the under surface 149 of which is presented in the path of the roll lugs 140, 140. Said surface 149 desirably is somewhat inclined camwise in the forward and downward direction for easy and positive lifting engagement of the lugs 140, 140 therewith, and of sufficient extent circumferentially of the roll 10 that as a register pin 20 thereof approaches and comes into upright position as in FIG. 6 the corresponding control lug 140 elevates the positioner cam element 145, and further maintains it in said raised position until further tape-feeding rotation of the roll 10 occurs, as in the start of a subsequent feed stroke of the hand lever 39 preferably including in the lift maintenance any slight initial lost-motion period of said hand lever as generally and herein desirably provided for feed pawl adjustment and insured knife clearance from the tape path.

The described positioner cam 145 has at the upper rear portion a beveled cam formation 150 with an outwardly and downwardly inclined cam face 151 for applying outward thrusting force at a similarly inclined cam surface 161 on the slide earlier mentioned and designated generally at 160, FIGS. 2, 4 and 6.

Said slide 160 is mounted on the upper or pinch roll carrier designated as a whole at 75 and herein specially constructed and arranged for said slide mounting and other novel functional purposes.

Figure 9:
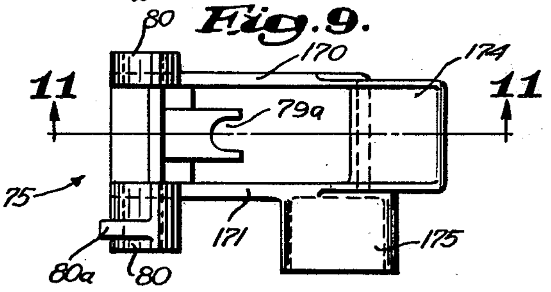

Said roll carrier 75 comprises a body or casting of overall general rectangular shape as viewed in plan, FIG. 9, extending longitudinally of the machine adjacent the top thereof. It includes a forward transverse portion having at an upper level thereof a pair of laterally spaced and aligned sleeve bearings 80, 80 for reception of a horizontal bearing stud 81 of a length to project beyond the two sides of the carrier 75 for relative rotative reception and mounting in and by preferably rearwardly and downwardly open bearings 82, 82 fixed on the side frames 1 and 2 of the machine. This roll carrier 75 as a whole is thereby mounted for pivoting in a vertical plane about the horizontal axis of the stud 81. A strong torsion spring 83, preferably comprising two aligned sections as seen in FIGS. 2 and 3, and surrounding an intermediate portion of the carrier pivot stud 81, urges the carrier 75 downwardly clockwise about its pivot point as viewed on FIGS. 1, 5, 10 and 11, for firm pinching tape-feeding relation of the upper pinch roll 70 with the driven lower roll 10 as the tape passes between the rolls at the bite thereof.

The forward portion of the carrier 75 has below the pivot bearings 80 a guide foot 79 having an undersurface of substantial lateral and longitudinal extent serving as a depressing guide for the tape forwardly of the bite of the rolls and en route to the cut-off knives 6, 7. Said foot includes a central rearward portion adapted to extend back in close approach to the line of bite of the rolls, see particularly FIGS. 9 to 11, as permitted by the reduced diameter of the central portion of the pinch roll 70, and there has a downwardly open longitudinal channel 79*a* for non-interferent passage of the register pins 20, 20 of the lower roll 10. The top wall of the foot 79 receives the resilient down thrust of the rear legs of the carrier-depressing spring element 83, the forward spring legs being anchored, in a torsion status of the spring, against a fixed part of the machine, herein being engaged over the top of the fixed knife 6. The roll carrier 75 further comprises two opposed longitudinal side walls 170, 171 extending parallely rearwardly from the described front portion and defining between them a vertically open space for reception of the rotary pinch roll element 70. Similarly as in said copending application said pinch roll or roll element 70 may be formed in two relatively rotatable axially aligned parts 71, 71, FIG. 2, of nylon or other hard durable material, each comprising an outer relatively narrow roll portion proper and an inner concentric hub-like portion, oppositely inward facing and of inwardly decreasing diameter to afford an annular channel centrally between the larger tape-engaging roll portions, for clearance of the register pins 20, 20 of the lower roll 10. Said pinch roll element 70 is rotatably carried on a journal pin 77, FIGS. 2 to 4, received in opposed bearing apertures 77*a*, see FIGS. 10 and 11, laterally oppositely located on the respective carrier side walls 170, 171 at an intermediate portion thereof. Rearwardly of the pinch roll 70 the carrier side walls 170, 171 are connected by a transverse rear wall 172 having a depending portion 173 with a rounded bottom wall and of a downward extent to lie closely over the path of the tape on the way from the supply and below and forwardly of the earlier described tape-looping tension control means.

Figure 10:
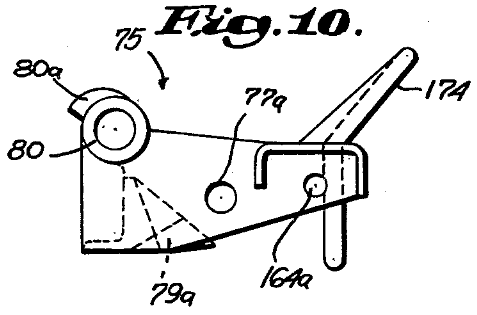
Figure 11:
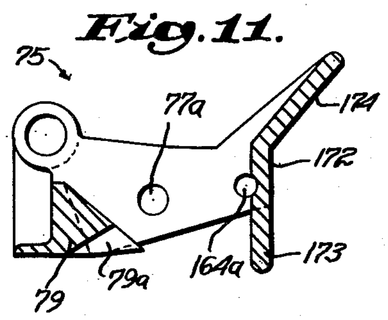

As shown, noting FIGS. 10 and 11, said rear dependent tape directing wall part 173 of the carrier extends down to a level substantially that of the bases of the register pins 20, 20 and of the adjacent cross-fluted peripheral surface of the feed roll 10 where, along with the carrier foot 79 just forwardly of the roll bite, it cooperates in locating the tape with the register holes *r* thereof received about the particular active register pin 20 when one such is presented in the upright position at the roll bite. Said dependent part 173 likewise coacts in the described manner in and with the earlier explained tape tension control and anti-back-lash means and constitutes a guide element for the lower portion of the front leg of the loop of tape formed between the roll supply and the feed rolls. At the top of the rear cross wall 172 of the carrier 75 is an upwardly and rearwardly extending finger piece 174, readily accessible to the operator, upon raising the machine cover 3*x* for pivotally swinging the carrier 75 upward about its mounting pivot 81 and against the down pressure of its loading spring 83, for convenience in threading in and starting the feed of a fresh tape roll R or for inspection or other purpose. A stop 80*a* on the carrier, herein on the outer wall of one of the carrier journals 80, 80, may be provided for limiting the manual upward and forward swinging of the carrier 75, by engagement with a fixed part of the machine such as an appropriately located inward projection on the adjacent side frame.

The described pinch roll carrier 75 further is adapted for operative support of the slide 160 earlier mentioned. Accordingly there is provided at a rear portion of one side wall of the carrier, herein that side wall 171 nearer the right side of the machine and in the general vertical longitudinal plane with the feed drive mechanism operatively associated with the hand lever 39, with a lateral outwardly projecting slide housing and slidably guiding formation 175 of inverted U-form as seen in side elevation as in FIG. 10, the downwardly open slide guiding channel thereby provided being of non-round cross-sectional contour and for sliding and non-rotative guidance of the mentioned slide 160.

Said slide 160 comprises a body or block for sliding movement laterally of the machine and relative to the carrier 75, including a hollow inner portion 162 carrying the downwardly and outwardly inclined cam surface 161 previously mentioned and an outer cylindrical sleeve portion 163. Such slide is laterally movably mounted and slidably guided on an elongate bearing stud 164 horizontally held in aligned apertures 164*a*, 164*a* in the respective carrier side walls 170, 171 and extending laterally outward so as to afford sliding guidance to both inner and outer portions 162, 163 of the slide 160. A coil spring 168 surrounding the stud 164 within the hollow interior of the inner slide portion 162 and held under compression at the respective ends between a relatively stationary shoulder 169, FIG. 2, and the inner end wall of said hollow slide portion 162, acts to spring load the slide 160 so that it is biased in the inward direction, substantially as in FIG. 4, and subject to lateral outward sliding movement at certain times under the camming coaction betwen the slide cam surface 161 and the described cam face 151 of the positioner cam 145.

In this manner, when a register pin 20 of the roll 10 is in the correct upright position, as in the return of the hand lever 39 from a full forward feeding stroke, the adjacent cam control lug 140 of the roll 10 has caused the slide 160 to be thrust laterally outward, by the lifting of the positioner cam 145 by said control lug 140. Hence the outer cylindrical lifting contact portion 163 of the slide is caused to stand in vertical line with the intermediary lifter finger 180 pivoted on the machine frame 2 in the rotary path of the hand lever operated lifting wiper cam element 185. Thereby the pinch roll carrier 75 and the pinch roll 70 thereon are lifted separatively or sufficiently to relieve the pinch roll pressure from the tape and so permit any usually relatively minor register adjustment as between the presented hole *r* of the tape and the then-presented register pin 20. In this connection it is further particularly noted that in conjunction with this pinch and feed roll separation or pressure relief there could result some extent of free-wheeling of the feed roll 10. This however is herein cooperatively avoided by means of an anti-reverse provision for said feed roll as best seen for example in FIG. 3, noting also FIG. 6.

This comprises a cog 190 pivoted as at 191 at the free end of an inwardly extending horizontal boss 192 on a stationary part of the machine, herein at the lower portion of the left side frame 1. A coil spring 194 partly wrapped about the boss 192 with its opposite ends anchored respectively to the cog 190 and to said boss urges the cog yieldingly toward the roll 10, upwardly and forwardly counterclockwise as seen in FIG. 6, but permitting the cog to yield reversely away from the roll 10 at certain times. Said cog 190 has a pointed nose 193 adapted to enter the valleys between serrations on the periphery of the feed roll 10, the pivot point 191 of the cog being so located with respect to said roll that the cog when so engaged blocks reverse movement, clockwise in FIG. 6, of the feed roll 10 under tape tension. However, a capacity for slight reverse movement for the feed roll 10 is desirable in conjunction with the register compensating separation of the feed rolls and is provided for in the illustrated example by locating the cog 190 in the medial plane of the feed roll 10 and in line with the path of the register pins 20 thereof and in proximity to the lowermost part of the feed roll 10.

Hence as one register pin 20 comes into upright register position at the top of the roll, with the accompanying separative relief of the pinch roll pressure through the described mechanism and by reason of such register pin upright presentation, the diametrically opposite register pin 20 then at the bottom of the roll 10 contacts and releases the cog 190 from anti-reverse holding of the feed roll 10, against the bias of the cog spring 194. Thus in timed relation with the register compensating separation of the feed rolls at their bite region the cog 190 is cooperatively released sufficiently to afford whatever usually relatively slight extent of reverse turning of the roll 10 may be appropriate for the proper accurate registry of the upright pin 20 in the particular presented tape hole *r*. It is understood that any slight registry adjustment for the tape relative to the roll is thus provided for under the invention, with the pressure of pinch roll 70 being relieved from the tape, and with the tape and the feed roll being enabled to accomplish automatically the slight relative adjustment between them through the described capacity for requisite relative adjustment as between the then active register hole *r* of the tape and the therein engaging upright register pin 20 of the roll.

From the description in connection with the drawings it will be apparent that the disclosed invention comprises among the features thereof and in cooperative relation in the registered-unit dispensing machine means increasing the positive nature of the register compensation and reducing the opportunity for introduction of tape and register pin misalignment errors, such as tend to enter if the rolls should have the pinch roll or the tape-pinching pressure at the bite of the rolls released when no register pin is present thereat. This is accomplished herein through the slide element 160 on the pinch roll carrier being shifted to take the lifter contact portion thereof out of position for active lifting contact by the cam finger 180 when the latter is upwardly wiped by the nose cam 185 in the return stroke of the hand lever and assuming that no register pin 20 is in the herein upright register position, as in the event of a less-than-full forward or feed stroke of said lever. Thus in effect the register compensating means is neutralized under such condition of register pin absence from correct register location and the then otherwise possible introduction of alignment error is avoided. In such condition of register pin absence it will be noted, in the present example, that the usual roll-lifting effort may be applied by the lever-returned nose cam 185 to the intermediary cam or lifter finger 180, but no roll lifting is accomplished due to the then lack of any laterally presented contact point on the roll carrier for said lifter finger 180 to engage, by reason of the automatic herein spring-pressed retraction of the slide 160 away from the herein vertical path of movement of said finger 180 due to the then inactivity or non-lifting of the slide controlling lifter cam 145, since no control lug 140 of the roll 10 is operatively adjacent thereto in the absence of a correctly uprightly positioned register pin 20.

Further importantly coacting with and contributing to the improved accurate positive "pin-in-hole" registration are the described provisions for maximum freedom in the rotation of the tape supply roll R including the core adapter rotary bearer or axle element and the tape tension control means including the disclosed yieldable dancer means or arm making for sufficient tension for the tape particularly between the roll supply and the feed rolls and the register means thereof yet with a minimum of friction and inertia. Said dancer means as apparent from the description and drawings serves to hold a sufficient amount of the tape in low-tension readiness to provide for pin-in-hole registration and feed of the tape without objectionable strain. The spring return of the dancer arm by drawing back against pinch roll pressure or, when full feed strokes are completed, against the presented register pin 20, enables subsequent feed from the thus free-turnable tape supply roll, said low-friction axis of tape roll rotation as disclosed making for easy take-up or rearward withdrawal of tape upon recoil of the dancer means.

It will be understood that our invention, whether as to method or apparatus, is not limited to the exemplary steps or embodiments herein illustrated or described, and we set forth its scope in our following claims:

We claim:

1. A tape machine for dispensing gummed tape having successive demarked areas of equal unit length with transverse division lines between them at which severance is to be effected for delivering single or plural unit lengths, said unit lengths each having a register hole in determined spaced relation to such division lines, said machine comprising

- elongate longitudinal side frames defining between them a path for such tape from a supply roll rotatably supported on a horizontal axis at a rear portion of the frames to a delivery station at a fore portion of the frames,
- rotary feed means for the tape at an intermediate portion of the frames,
- tape severing means forwardly beyond the feed means, said feed means including
- a lower feed roll below the tape path and having radially projecting register pins spaced by circumferential linear increments equalling a unit length of the tape and the distance between adjacent register holes thereof and
- an upper pinch roll element having laterally spaced roll portions for engaging the upper face of the tape in opposition to the lower roll and straddling the rotary path of the register pins thereof,
- means to drive the lower feed roll,
- a vertically movable carrier rotatably mounting said upper roll,
- spring means yieldably urging said upper roll into tape-feeding pinch relation to the lower roll at a bite line whereat said register pins are successively presentable in substantially upright registry position for engagement in a tape hole and in tape unit length spacing reawardly of said severing means, and
- mechanism actuatable with the feed roll drive means at the final portion of a dispensing cycle for lifting the upper roll carrier to relieve the tape from pinch feeding relation for enabling register compensating adjustment as between the tape and the feed rolls only when a register pin is presented in said substantially upright register position.

2. A tape machine for dispensing gummed tape having successive demarked areas of equal unit length with transverse division lines between them at which severance is to be effected for delivering single or plural unit lengths, said unit lengths each having a register hole in determined spaced relation to such division lines, said machine comprising

- elongate longitudinal side frames defining between them a path for such tape from a supply roll rotatably supported on a horizontal axis at a rear portion of the frames to a delivery station at a fore portion of the frames,
- rotary feed means for the tape at an intermediate portion of the frames,
- tape severing means forwardly beyond the feed means, said feed means including
- a lower feed roll below the tape path and having radially projecting register pins spaced by circumferential linear increments equalling a unit length of the tape and the distance between adjacent register holes thereof and
- an upper pinch roll element having laterally spaced roll portions for engaging the upper face of the tape in opposition to the lower roll and straddling the rotary path of the register pins thereof,
- means to drive the lower feed roll,
- a vertically movable carrier rotatably mounting said upper roll,
- spring means yieldably urging said upper roll into tape-feeding pinch relation to the lower roll at a bite line whereat said register pins are successively presentable in substantially upright registry position for engagement in a tape hole and in tape unit length spacing rearwardly of said severing means, and
- mechanism actuatable with the feed roll drive means at the final portion of a dispensing cycle for lifting the upper roll carrier to relieve the tape from pinch feeding relation for enabling register compensating adjustment as between the tape and the feed rolls when a register pin is presented in said substantially upright register position, said tape register compensating mechanism including
- roll separation control lugs carried on the lower feed roll, and positionally correlated with the respective register pins, and adapted to render the upper roll lifter means active or inactive according to the position of the register pins at the end of a tape dispensing cycle.

3. A tape machine for dispensing gummed tape having successive demarked areas of equal unit length with transverse division lines between them at which severance is to be effected for delivering single or plural unit lengths, said unit lengths each having a register hole in determined spaced relation to such division lines, said machine comprising

- elongate longitudinal side frames defining between them a path for such tape from a supply roll rotatably supported on a horizontal axis at a rear portion of the frames to a delivery station at a fore portion of the frames,
- rotary feed means for the tape at an intermediate portion of the frames,
- tape severing means forwardly beyond the feed means, said feed means including
- a lower feed roll below the tape path and having radially projecting register pins spaced by circumferential linear increments equalling a unit length of the tape and the distance between adjacent register holes thereof and an upper pinch roll element having laterally spaced roll portions for engaging the upper face of the tape in opposition to the lower roll and straddling the rotary path of the register pins thereof, means to drive the lower feed roll, a vertically movable carrier rotatably mounting said upper roll, spring means yieldably urging said upper roll into tape-feeding pinch relation to the lower roll at a bite line whereat said register pins are successively presentable in substantially upright registry position for engagement in a tape hole and in tape unit length spacing rearwardly of said severing means, and mechanism actuatable with the feed roll drive means at the final portion of a dispensing cycle for lifting the upper roll carrier to relieve the tape from pinch feeding relation for enabling register compensating adjustment as between the tape and the feed rolls when a register pin is presented in said substantially upright register position, said tape register compensating mechanism including means for rendering that mechanism inactive under condition of register pin absence from said substantially upright register position.

4. A tape machine for dispensing gummed tape having successive demarked areas of equal unit length with transverse division lines between them at which severance is to be effected for delivering single or plural unit lengths, said unit lengths each having a register hole in determined spaced relation to such division lines, said machine comprising elongate longitudinal side frames defining between them a path for such tape from a supply roll rotatably supported on a horizontal axis at a rear portion of the frames to a delivery station at a fore portion of the frames, rotary feed means for the tape at an intermediate portion of the frames, tape severing means forwardly beyond the feed means, said feed means including a lower feed roll below the tape path and having radially projecting register pins spaced by circumferential linear increments equalling a unit length of the tape and the distance between adjacent register holes thereof and an upper pinch roll element having laterally spaced roll portions for engaging the upper face of the tape in opposition to the lower roll and straddling the rotary path of the register pins thereof, means to drive the lower feed roll, a vertically movable carrier rotatably mounting said upper roll, spring means yieldably urging said upper roll into tape-feeding pinch relation to the lower roll at a bite line whereat said register pins are successively presentable in substantially upright registry position for engagement in a tape hole and in tape unit length spacing rearwardly of said severing means, and mechanism actuatable with the feed roll drive means at the final portion of a dispensing cycle for lifting the upper roll carrier to relieve the tape from pinch feeding relation for enabling register compensating adjustment as between the tape and the feed rolls when a register pin is presented in said substantially upright register position, said tape register compensating mechanism including means for rendering that mechanism inactive under condition of register pin absence from said substantially upright register position, and said tape register compensating mechanism including further means comprising roll separation control lugs associated with said lower feed roll and positionally correlated with the respective register pins, said lugs adapted to neutralize said compensating mechanism inactivating means under condition of register pin presence in said substantially upright register position.

References Cited by the Examiner

UNITED STATES PATENTS

| | | | |
|---|---|---|---|
| 975,517 | 11/10 | Stambaugh | 83—264 |
| 1,039,167 | 9/12 | Meier et al. | 83—264 |
| 2,333,109 | 11/43 | Krueger et al. | 83—261 |
| 2,613,739 | 10/52 | Lefere | 83—261 |
| 2,826,251 | 3/58 | Hopkins | 83—261 |
| 2,961,907 | 11/60 | Hohlbein | 83—13 |
| 3,063,322 | 11/62 | Thomas | 83—261 |
| 3,064,511 | 11/62 | Allander | 83—13 |

ANDREW R. JUHASZ, *Primary Examiner.*